United States Patent
Duggan et al.

(10) Patent No.: US 6,619,119 B1
(45) Date of Patent: Sep. 16, 2003

(54) BALANCE WEIGHT FOR VEHICULAR DRIVESHAFT

(75) Inventors: James A. Duggan, Temperance, MI (US); Calvin W. Szymkowiak, Swanton, OH (US); Gerald L. Myers, Maumee, OH (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/476,473

(22) Filed: Dec. 30, 1999

Related U.S. Application Data
(60) Provisional application No. 60/114,565, filed on Dec. 31, 1998.

(51) Int. Cl.[7] ............................................. G01M 1/00
(52) U.S. Cl. ........................................ 73/487; 74/573 R
(58) Field of Search ........................ 74/573 R; 301/5.21, 301/5.22; 73/487; 464/180

(56) References Cited

U.S. PATENT DOCUMENTS

| | | | |
|---|---|---|---|
| 3,177,039 A | | 4/1965 | Skidmore ........................ 301/5 |
| 3,273,941 A | | 9/1966 | Skidmore ........................ 301/5 |
| 3,786,850 A | * | 1/1974 | Turoczi, Jr. ................... 152/330 |
| 3,905,648 A | * | 9/1975 | Skidmore ..................... 301/5 B |
| 3,939,020 A | * | 2/1976 | Caramanian, deceased et al. ............... 156/64 |
| 3,960,409 A | | 6/1976 | Songer ........................ 301/5 B |
| 4,300,803 A | * | 11/1981 | Chorosevic .................. 301/5 B |
| 4,379,596 A | | 4/1983 | Green et al. ................. 301/5 D |
| 4,887,989 A | * | 12/1989 | Kerecman ................... 464/180 |
| 4,895,551 A | * | 1/1990 | Fritz ........................... 464/180 |
| 4,998,448 A | * | 3/1991 | Ellis, Jr. ..................... 74/573 R |
| 5,633,093 A | | 5/1997 | Rhoda et al. ................ 428/653 |
| 5,722,896 A | * | 3/1998 | Beagley et al. ............. 464/180 |
| 5,778,737 A | * | 7/1998 | Welsh et al. ............... 74/573 R |
| 5,983,750 A | * | 11/1999 | Burgers ........................ 74/574 |
| 6,032,551 A | * | 3/2000 | Welsh et al. ............... 74/573 R |
| 6,050,900 A | * | 4/2000 | Reinhardt et al. .......... 464/180 |
| 6,123,623 A | * | 9/2000 | Sugiyama .................... 464/180 |
| 6,334,568 B1 | * | 1/2002 | Seeds ....................... 228/114.5 |
| 6,345,551 B1 | * | 2/2002 | Oetiker ...................... 74/573 R |
| 6,413,626 B1 | * | 7/2002 | Wollner ..................... 428/317.3 |

* cited by examiner

*Primary Examiner*—Hezron Williams
*Assistant Examiner*—Charles D Garber
(74) *Attorney, Agent, or Firm*—MacMillan, Sobanski & Todd, LLC

(57) ABSTRACT

A balance weight is secured to a driveshaft tube for rotatably balancing the driveshaft tube during use. The balance weight includes a first inner layer of material and a second outer layer of material that are secured together to form an integral unit. The first and second layers of material may be secured together in any desired manner, such as by adhesives, pressure bonding, tinning, and the like. The inner layer is preferably sufficiently flexible to bend with the driveshaft tube during use and is preferably formed from a material that does not react with either the material used to form the driveshaft tube, the material used to secure the inner layer to the driveshaft tube, or the environment in which the inner layer is used in such a manner as to reduce the ability of the balance weight to be retained on the driveshaft tube. The inner layer can be formed from a stainless steel alloy having a relatively small thickness that allows it to bend with the driveshaft tube during use. The outer layer is preferably formed from a material that also is capable of bending with the driveshaft tube during use, but has high weight density so as to be capable of balancing the driveshaft tube while maintaining a relatively small physical size. The outer layer may be formed from lead or a lead alloy material having a relatively large thickness. One or more grooves may be formed in the outer surface of the outer layer to facilitate flexing of the outer layer with the driveshaft tube. The balance weight is secured to the outer surface of the driveshaft tube by a layer of adhesive that bonds the inner layer of the balance weight to the outer surface of the driveshaft tube.

18 Claims, 4 Drawing Sheets

BALANCE WEIGHT FOR VEHICULAR DRIVESHAFT

CROSS REFERENCE TO RELATED APPLICATION

This application claims the benefit of United States Provisional Application No. 60/114,565, filed Dec. 31, 1998, the disclosure of which is incorporated herein by reference.

BACKGROUND OF THE INVENTION

This invention relates in general to balance weights for balancing an unbalanced rotatable member for rotation. More specifically, this invention relates to an improved structure for a balance weight adapted to be adhered to a driveshaft tube connected between an engine/transmission assembly to an axle assembly in a vehicular drive train assembly for rotatably balancing the driveshaft tube during use.

Torque transmitting shafts are widely used for transferring rotational power between a source of rotational power and a rotatably driven mechanism. An example of a torque transmitting shaft is a driveshaft tube used in a vehicle driveshaft assembly. The driveshaft assembly transmits rotational power from a source, such as an engine, to a driven component, such as a pair of wheels. A typical vehicle driveshaft assembly includes a hollow cylindrical driveshaft tube having an end fitting secured to each end. Usually, the end fittings are tube yokes that are adapted to cooperate with respective universal joints. For example, a driveshaft assembly of this general type is often used to provide a rotatable driving connection between the output shaft of a vehicle transmission and an input shaft of an axle assembly for rotatably driving the vehicle wheels.

Ideally, each driveshaft tube would be manufactured in the shape of a cylinder that is absolutely round, absolutely straight, and has an absolutely uniform wall thickness. Such a perfectly shaped driveshaft tube would be precisely balanced for rotation and, therefore, would not generate any undesirable noise or vibration during use. In actual practice, however, the driveshaft tubes usually contain variations in roundness, straightness, and wall thickness that result in minor unbalances when rotated at high speeds. To prevent such unbalances from generating undesirable noise or vibration, therefore, it is commonplace to counteract such imbalances by securing balance weights to selected portions of the driveshaft tube. The balance weights are sized and positioned to counterbalance the unbalances of the driveshaft tube such that it is balanced for rotation during use.

Traditionally, vehicular driveshaft tubes have been formed from steel alloys or other metallic materials having relatively high melting temperatures. In such driveshaft tubes, welding has been commonly used to secure the balance weights thereto. More recently, however, driveshaft tubes have been formed from aluminum alloys and other metallic materials that are not well suited for welding balance weights thereto, particularly in the high volume quantities usually associated with the vehicular manufacturing industry. Also, driveshaft tubes have recently been formed from composites and other materials that are not suited at all for welding.

To balance driveshaft tubes formed from these alternative materials, it has been proposed to use adhesives to secure the balance weights to the driveshaft tubes. In the past, the balance weights have typically been formed from steel alloy materials. Such steel alloy materials have been found not to interact adversely with the aluminum alloy used to form the driveshaft. Also, steel alloy materials have been found not to be prone to surface oxidation, which can cause undesirable de-bonding of the balance weight from the driveshaft tube. Unfortunately, however, it has been found that balance weights formed from such steel alloy materials were relatively inflexible in comparison with the relatively thin walled aluminum driveshaft tubes to which they were attached. Because of this, it has been found that under certain operating conditions, the aluminum driveshaft tube could flex beyond the ability of the steel alloy balance weight to bend accordingly. When this occurs, the adhesive extending between the outer surface of the driveshaft tube and the inner surface of the balance weight can fracture or otherwise fail, causing the balance weight to fall off of the driveshaft tube.

One possible solution to this problem would be to form the balance weight from a material that is more flexible that steel alloy materials, such as lead. The use of such relatively flexible materials would allow the balance weight to flex with the aluminum driveshaft tube during use, thereby preventing damage to the adhesive extending therebetween. However, it has been found that lead and other relatively flexible materials are prone to surface oxidation, particularly in the presence of some of the materials that are used as adhesives to secure the balance weight to the outer surface of the driveshaft tube. Such surface oxidation can reduce the bonding strength of the adhesive, causing the balance weight to fall off of the driveshaft tube when it is rotated at high speeds during use. Thus, it would be desirable to provide an improved structure for a balance weight adapted to be adhered to an outer surface of a driveshaft tube that can accommodate flexing movement of a driveshaft tube, yet is not subject to surface oxidation or other conditions that might reduce the bonding strength of the adhesive.

SUMMARY OF THE INVENTION

This invention relates to an improved structure for a balance weight that is adapted to be adhered to a driveshaft tube connected between an engine/transmission assembly to an axle assembly in a vehicular drive train assembly for rotatably balancing the driveshaft tube during use. The driveshaft tube is preferably formed from an aluminum alloy material and has a balance weight secured to the outer surface thereof to counterbalance the unbalances of the driveshaft tube. The balance weight includes a first inner layer of material and a second outer layer of material that are secured together to form an integral unit. The first and second layers of material may be secured together in any desired manner, such as by adhesives, pressure bonding, tinning, electroplating, and the like. The inner layer is preferably sufficiently flexible to bend with the driveshaft tube during use and is preferably formed from a material that does not react with either the material used to form the driveshaft tube, the material used to adhere the inner layer to the driveshaft tube, or the environment in which the inner layer is used in such a manner as to reduce the ability of the balance weight to be retained on the driveshaft tube. In a first embodiment, the inner layer can be formed from a stainless steel alloy having a relatively small thickness that allows it to bend with the driveshaft tube during use. The outer layer is preferably formed from a material that also is capable of bending with the driveshaft tube during use, but has high weight density so as to be capable of balancing the driveshaft tube while maintaining a relatively small physical size. The outer layer may be formed from lead or a lead alloy material having a relatively large thickness. One or more grooves may be formed in the outer surface of the outer layer to facilitate flexing of the outer layer with the driveshaft tube. The balance weight is secured to the outer surface of the driveshaft tube by a layer of adhesive that bonds the inner layer of the balance weight to the outer surface of the driveshaft tube. In a second embodiment, the inner layer is a relatively thin layer of tin that is electroplated to the outer layer of lead. The balance weight is secured to the outer surface of the driveshaft tube by a layer of adhesive that bonds the electroplated tin layer of the balance weight to the outer surface of the driveshaft tube.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
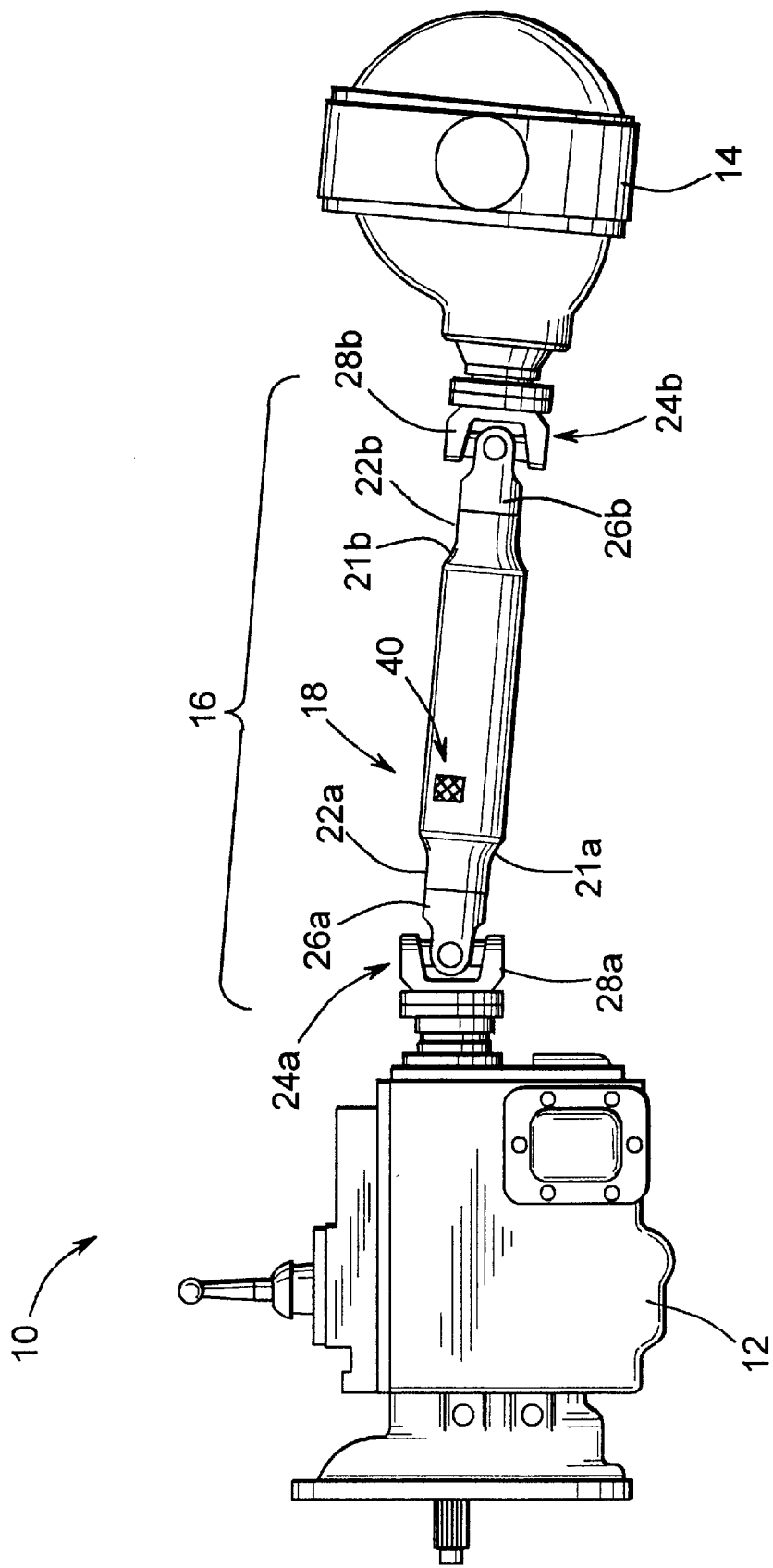
FIG. 1 is a side elevational view of a vehicle drive train assembly having a first embodiment of a balance weight secured to a driveshaft tube for rotatably balancing the driveshaft tube during use in accordance with this invention.

Referring now to the drawings, there is illustrated in FIG. 1 a vehicle drive train assembly, indicated generally at 10, that is generally conventional in the art. The drive train assembly 10 includes a transmission 12 having an output shaft (not shown) that is connected to an input shaft (not shown) of an axle assembly 14 through a driveshaft assembly 16. The transmission 12 is rotatably driven by an engine (not shown) or other source of rotational power in a conventional manner. The driveshaft assembly 16 includes a cylindrical driveshaft tube, indicated generally at 18, having a center portion 20 and a pair of opposed end portions 22a and 22b. The driveshaft tube 18 is preferably formed from an aluminum alloy material, although such is not necessary. In the illustrated embodiment, the center portion 20 of the driveshaft tube 18 is formed having a larger outer diameter than either of the end portions 22a and 22b. Thus, transition regions 21a and 21b are defined between the larger diameter center portion of the illustrated driveshaft tube 18 and each of the smaller diameter end portions 22a and 22b thereof. However, the driveshaft tube 18 may be formed having a constant diameter throughout the length thereof or any other desired shape. Alternatively, the single driveshaft tube 18 may be replaced by a compound driveshaft assembly (not shown) having separate first and second driveshaft sections that are supported by a center bearing assembly between the transmission 12 and the axle assembly 14.

The output shaft of the transmission 12 and the input shaft of the axle assembly 14 are typically not co-axially aligned. To accommodate this, a pair of universal joints, indicated generally at 24a and 24b, are provided at the end portions 22a and 22b of the driveshaft tube 18 to respectively connect the driveshaft tube 18 to the output shaft of the transmission 12 and to the input shaft of the axle assembly 14. The first universal joint 24a includes a tube yoke 26a that is secured to the forward end portion 22a of the driveshaft tube 18 by any conventional means, such as by welding. The first universal joint 24a further includes an end yoke 28a that is connected to the output shaft of the transmission 12. The end yoke 28a may, if desired, be a conventional slip yoke that is capable of limited axial movement relative to the output shaft of the transmission 12. The second universal joint 24b includes a tube yoke 26b that is secured to the rearward end portion 22b of the driveshaft tube 18 by any conventional means, such as by welding. The first universal joint 24b further includes an end yoke 28b that is connected to the input shaft of the axle assembly 14.

As is well known in the art, most driveshaft tubes, such as the driveshaft tube 18, usually contain variations in roundness, straightness, and wall thickness that result in minor unbalances when rotated at high speeds. To prevent such unbalances from generating undesirable noise or vibration, it is commonplace to counteract such unbalances by securing one or more balance weights to selected portions of the driveshaft tube 18. Thus, as shown in FIG. 1, a balance weight, indicated generally at 40, is secured to the outer surface of the driveshaft tube 18. The balance weight 40 is sized and positioned in a conventional manner to counterbalance the unbalances of the driveshaft tube 18 such that the driveshaft tube 18 and the drive train assembly 10 as a whole are balanced for rotation during use. It is not uncommon for a plurality of such balance weights 40 to be secured to the driveshaft tube 18 or to other portions of the drive train assembly 10 for this purpose, and such are contemplated to be within the scope of this invention.

Figure 2:
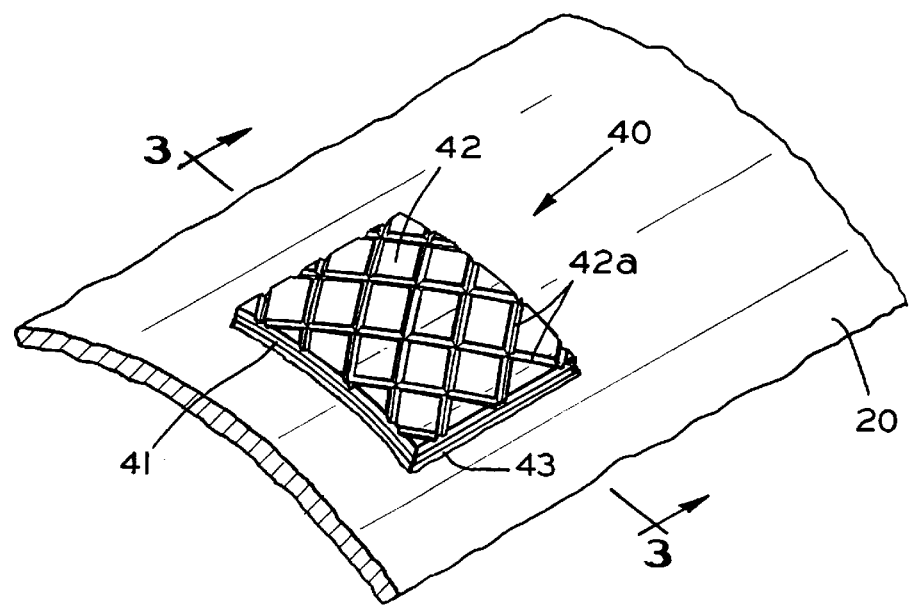
FIG. 2 is an enlarged perspective view of a portion of the driveshaft tube illustrated in FIG. 1 having the first embodiment of the balance weight secured thereto.
Figure 3:
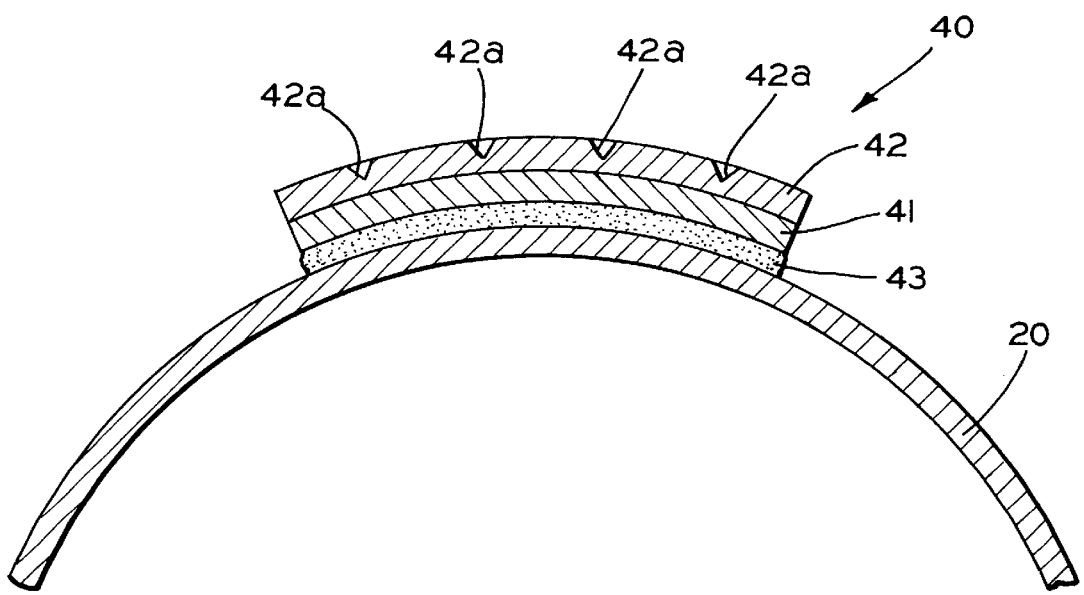
FIG. 3 is an enlarged sectional elevational view of the first embodiment of the balance weight taken along line 3—3 of FIG. 2.

Referring now to FIGS. 2 and 3, the structure of the balance weight 40 is illustrated in detail. As shown therein, the balance weight 40 includes a first inner layer of material 41 and a second outer layer of material 42 that are secured together to form an integral unit. The first and second layers of material 41 and 42 may be secured together in any desired manner, such as by adhesives, pressure bonding, tinning, and the like. The inner layer 41 is preferably relatively small in thickness in comparison with the outer layer 42. However, the relative thicknesses of the first and second layers 41 and 42 may be selected to have any desired relationship. The inner layer 41 and the outer layer 42 are preferably formed from different materials, although such is not necessary.

The inner layer 41 is preferably formed in such a manner as to be sufficiently flexible to bend with the driveshaft tube 18 during use. At the same time, the inner layer 41 is preferably formed from a material that does not react with either the material used to form the driveshaft tube 18, the material used to secure the inner layer 41 to the driveshaft tube 18 (discussed in detail below), or the environment in which the inner layer is used (i.e., the atmosphere, water, salt, and the like) in such a manner as to reduce the ability of the balance weight 40 to be retained on the driveshaft tube 18. For example, the inner layer 41 can be formed from a stainless steel alloy having a relatively small thickness (measured radially relative to the driveshaft tube 18), such as in the range of from about 0.001 inch to about 0.005 inch (0.0025 cm to 0.0127 cm), and preferably not more than 0.003 inch (0.00762 cm). However, this invention contemplates that the inner layer 41 may be formed from other materials having varying thicknesses. By forming the inner layer 41 of this material and in this manner, the inner layer 41 will be sufficiently thin as to be capable of bending with the driveshaft tube 18 during use, as described above. At the same time, the inner layer 41 will not adversely react with the material used to form the driveshaft tube 18, the material used to secure the inner layer 41 to the driveshaft tube 18, or the environment in which the inner layer is used in such a manner as to reduce the ability of the balance weight 40 to be retained on the driveshaft tube 18.

The outer layer 42 is preferably formed from a material that also is capable of bending with the driveshaft tube 18 during use. However, it is desirable that the outer layer 42 be formed from a material having a relatively high weight density so as to be capable of balancing the driveshaft tube 18 while maintaining a relatively small physical size. For example, the outer layer 42 may be formed from lead or a lead alloy material having a relatively large thickness (also measured radially relative to the driveshaft tube 18), such as about 0.070 inch (0.178 cm). However, this invention contemplates that the inner layer 41 may be formed from other materials having varying thicknesses. By forming the outer layer 42 in this manner, the outer layer 42 will be capable of bending with the driveshaft tube 18 during use.

In order to increase the overall flexibility of the balance weight 40, one or more grooves 42a may be formed in the outer surface of the outer layer 42. In the illustrated embodiment, a plurality of such grooves 42a are formed in a cross-hatched pattern to facilitate flexing of the outer layer 42 in any direction. However, such grooves 42a can be provided in any desired form or pattern to increase the flexibility of the outer layer 42 and, therefore, the balance weight 40 as a whole.

The balance weight 40 is secured to the outer surface of the driveshaft tube 18 by a layer of adhesive 43. The layer of adhesive 43 bonds the inner layer 41 to the outer surface of the driveshaft tube 18. The layer of adhesive 43 may be embodied as any desired adhesive material. For example, the layer of adhesive may be embodied as a multi-cure adhesive material including an adhesive portion and a curing activator portion. Curing of the adhesive may be effected or accelerated in any desired manner, such as by ultraviolet light, heat, chemicals, and the like.

Figure 4:
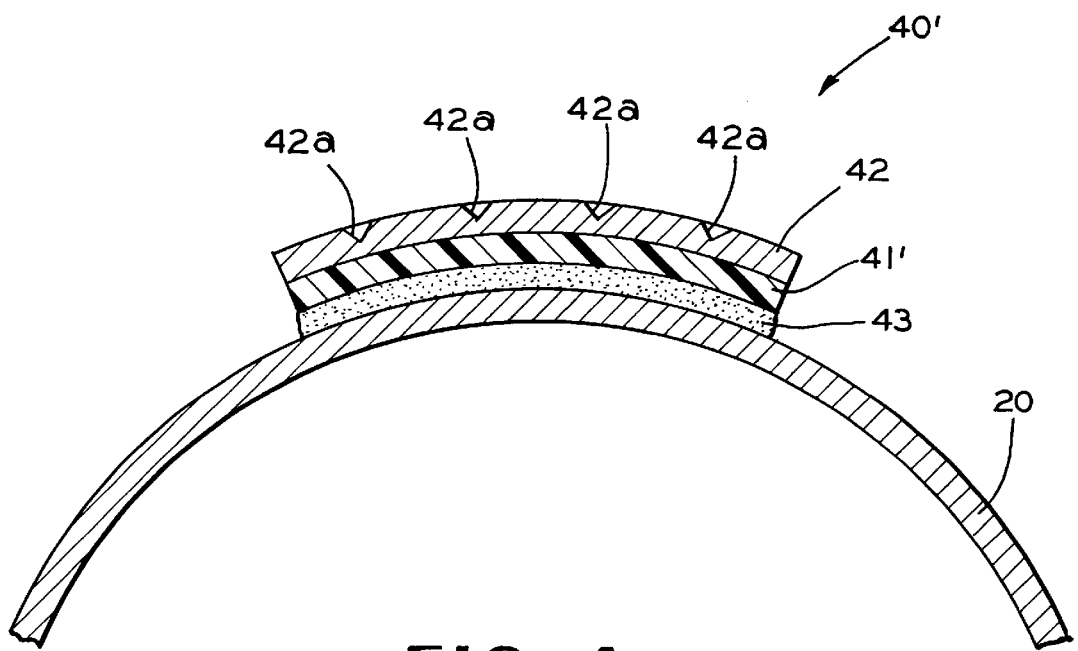
FIG. 4 is a sectional elevational view similar to FIG. 3 illustrating a second embodiment of the balance weight.
Figure 5:
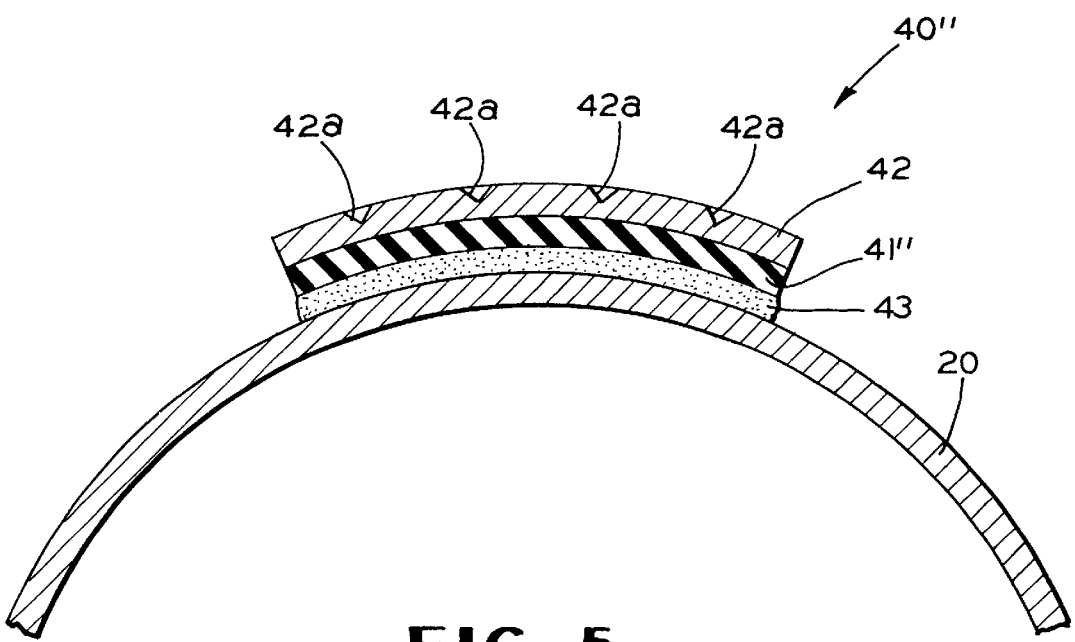
FIG. 5 is a sectional elevational view similar to FIG. 3 illustrating a third embodiment of the balance weight.

As discussed above, the inner layer 41 is preferably formed from a metallic material. However, as shown in FIGS. 4 and 5, the inner layer 41 may be formed from other materials. As shown in the second embodiment of the balance weight 40' illustrated in FIG. 4, the inner layer 41' may be formed from a layer of plastic material. Alternatively, as shown in the third embodiment of the balance weight 40" illustrated in FIG. 4, the inner layer 41" may be formed from a thin layer polymer coating or primer applied to either the outer surface of the driveshaft tube 18 or the inner surface of the outer layer 42 by spraying, painting, dipping, and the like. The polymer material may, for example, be formed from Chem-Glaze manufactured by Lord Corporation or Isonel manufactured by Schenectady International.

Figure 6:
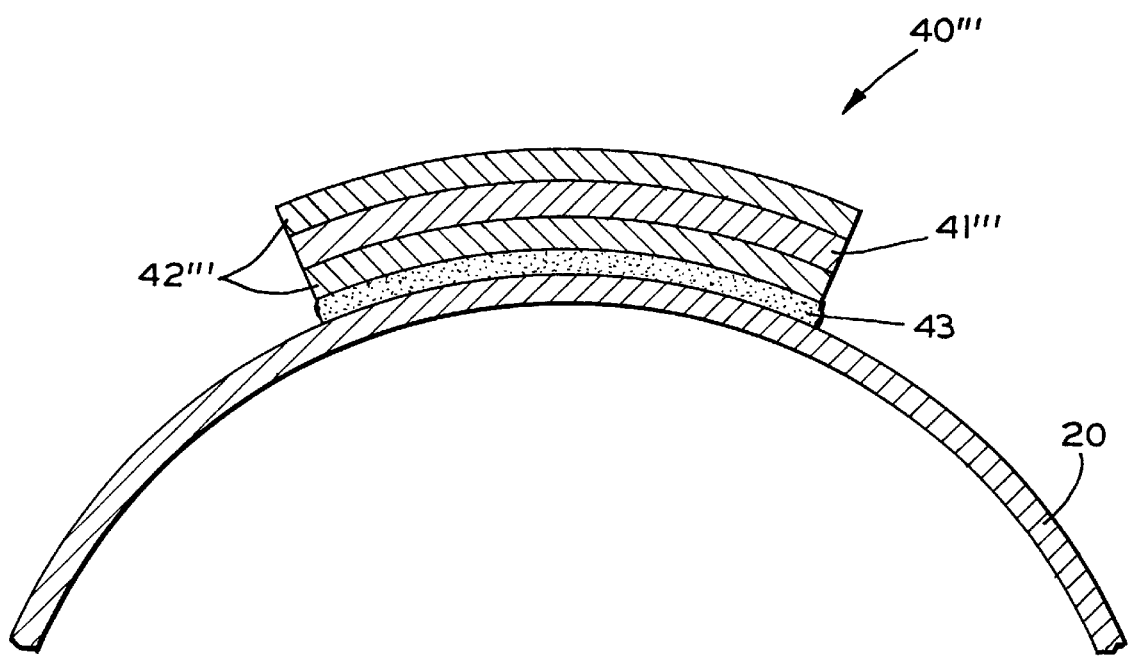
FIG. 6 is a sectional elevational view similar to FIG. 3 illustrating a fourth embodiment of the balance weight.

A fourth embodiment of a balance weight, indicated generally at 40''', in accordance with this invention is illustrated in FIG. 6. As shown therein, the balance weight 40''' includes a body 41''' that is provided with a coating 42''' on at least one, but preferably both, sides thereof. Preferably, the body 41''' is formed from a strip of a metallic material that is relatively flexible and has a relatively high weight density, such as lead or an alloy thereof. The coating 42''' is preferably formed from a metallic material that can readily bond molecularly with the material used to form the body 41''', such as tin or an alloy thereof. The coating 42''' can be applied to the surfaces of the body 41''' by electroplating, although other processes, such as electro-deposition, soldering, and the like, may be used. The coating 42''' of such electroplated tin has been found to bond readily with the adhesive 43 used to secure the balance weight 40''' to the outer surface of the driveshaft tube 18. As mentioned above, it has been found to be desirable to apply the coating 42''' to both the inner and outer surfaces of the body 41'''. This is done to facilitate the handling and installation of the balance weight 40'''. Specifically, if both the inner and outer surfaces of the body 41''' are provided with the coating 42''', then either surface may be used to secure the balance weight to the outer surface of the driveshaft tube 18. Accordingly, a person that is performing the balancing operation on the driveshaft tube 18 need not consume time to determine which side of the balance weight 40''' should be disposed adjacent to the outer surface of the driveshaft tube 18. The coating 42''' of this material has been found not to be prone to surface oxidation, which can cause undesirable de-bonding of the balance weight 40''' from the driveshaft tube 18.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An article that is balanced for rotation comprising:

an unbalanced article having an outer surface, said unbalanced article being formed from a first metallic material; and a balance weight that is secured to said outer surface of said unbalanced article to balance said unbalanced article for rotation, said balance weight including a first layer and a second layer, said first layer having a first thickness and being formed from a second metallic material that is different from said first metallic material, said second layer having a second thickness that is larger than said first thickness of said first layer and being formed from a third metallic material, said first layer being secured to said outer surface of said unbalanced article without the use of welding, said second layer being secured to said first layer.

2. The article defined in claim 1 wherein said first metallic material is an aluminum material and said second metallic material is a steel material.

3. The article defined in claim 1 wherein said unbalanced article is formed from a first metallic material, said first layer of said balance weight is formed from a second metallic material that is different from said first metallic material, and said second layer of said balance weight is formed from a third metallic material that is different from said second metallic material.

4. The article defined in claim 3 wherein said first metallic material is an aluminum material and said second metallic material is a steel material.

5. The article defined in claim 3 wherein said first metallic material is an aluminum material, said second metallic material is a steel material, and said third metallic material is an iron material.

6. The article defined in claim 1 wherein said first layer is secured to said outer surface of said unbalanced article.

7. The article defined in claim 1 wherein said second layer is secured to said first layer by one of adhesives, pressure bonding, and tinning.

8. The article defined in claim 1 wherein said first layer is secured to said outer surface of said article by adhesive.

9. A driveshaft that is balanced for rotation comprising:

an unbalanced driveshaft having an outer surface, said unbalanced driveshaft being formed from aluminum; and a balance weight that is secured to said outer surface of said unbalanced driveshaft to balance said unbalanced driveshaft for rotation, said balance weight including a first layer and a second layer, said first layer having a first thickness in the range of from about 0.001 inch to about 0.005 inch (0.0025 cm to 0.0127 cm) and being formed from steel, said second layer having a second thickness that is larger than said first thickness of said first layer and being formed from iron, said first layer being secured to said outer surface of said unbalanced driveshaft without the use of welding, said second layer being secured to said first layer.

10. An article that is balanced for rotation comprising:

an unbalanced article having an outer surface;

a balance weight including a first layer that is formed from a first material and a second layer that is formed from a second material, said second layer being secured to said first layer and having a plurality of grooves formed in a cross-hatched pattern in an outer surface thereof; and a layer of adhesive material securing, without the use of welding, said first layer of said balance weight to said outer surface of said unbalanced article to balance said unbalanced article for rotation.

11. The rotationally balanced article defined in claim 10 wherein said unbalanced article is formed from a material that is different from said first material.

12. The rotationally balanced article defined in claim 10 wherein said first layer is formed having a first thickness, and wherein said second layer is formed having a second thickness that is larger than said first thickness.

13. The rotationally balanced article defined in claim 10 wherein said first layer is formed from a steel alloy material.

14. The rotationally balanced article defined in claim 10 wherein said first layer is formed from a plastic material.

15. The rotationally balanced article defined in claim 10 wherein said first layer is formed from a polymer material.

16. The rotationally balanced article defined in claim 10 wherein said second layer is formed from lead.

17. The rotationally balanced article defined in claim 10 wherein said first and second layers are secured together by one of adhesives, pressure bonding, tinning, spraying, painting, or dipping.

18. The rotationally balanced article defined in claim 10 wherein said unbalanced article is a driveshaft.

* * * * *